United States Patent
Hederich et al.

[11] 3,754,858
[45] Aug. 28, 1973

[54] PROCESS FOR CONTINUOUS DYEING POLYESTER FIBER MATERIAL WITH ANTHRAQUINONE DYESTUFF

[75] Inventors: Volker Hederich; Gunter Gehrke; Manfred Groll, all of Cologne, Germany

[73] Assignee: Bayer Aktiengesellschaft, Leverkusen, Germany

[22] Filed: Jan. 28, 1971

[21] Appl. No.: 110,591

[30] Foreign Application Priority Data
Feb. 4, 1970 Germany.................. P 20 05 012.8

[52] U.S. Cl.............................. 8/39, 8/25, 8/93, 8/174, 260/373
[51] Int. Cl............................................. D06p 1/20
[58] Field of Search ................... 8/25, 174, 94, 39; 260/373

[56] References Cited
UNITED STATES PATENTS
3,557,155  1/1971  Yamada et al...................... 260/373
3,510,243  5/1970  Seuret et al........................ 8/174 X
3,505,362  4/1970  Hederich et al. .................. 260/373

OTHER PUBLICATIONS
WAS White Amer. Dyestuff Reporter, July 31, 1967, pages 18–24 TP890 A512.

Straley et al., Def. Pub. of Serial No. 677,016 filed Oct. 23, 1967, published in 856OG670 on Nov. 19, 1968, Defensive Publication No. T856,031.

Primary Examiner—Mayer Weinblatt
Assistant Examiner—T. J. Herbert, Jr.
Attorney—Plumley & Tyner

[57] ABSTRACT

Process for the continuous dyeing of synthetic fibre materials from organic solvents wherein the fibre materials are impregnated with dye liquors containing anthraquinone dyestuffs of the formula

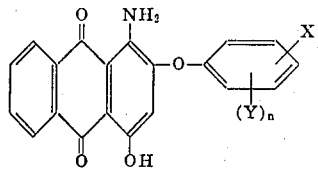

in which X, Y and n have the meaning given in the description below and are subsequently subjected to a heat treatment. There are obtained without originating waste waters dyeings which are characterised by excellent fastness properties.

8 Claims, No Drawings

PROCESS FOR CONTINUOUS DYEING POLYESTER FIBER MATERIAL WITH ANTHRAQUINONE DYESTUFF

The invention relates to a process for the continuous dyeing of synthetic fibre materials from organic solvents; more particularly it concerns a process for the continuous dyeing of synthetic fibre materials from organic solvents wherein the fibre materials are impregnated with dye liquors containing anthraquinone dyestuffs of the formula

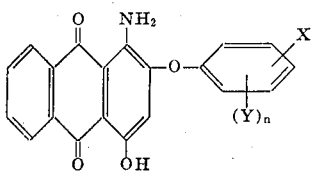

(I)

in which
X stands for one of the groups —OR, —COOR, —O—COR or —OCO$_2$R where R denotes an alkyl, cycloalkyl, aralkyl or aryl radical; for the group —OSO$_2$R$_1$ where R$_1$ denotes an alkyl, cycloalkyl, aralkyl, aryl or dialkylamino radical; or for an aryloxy-sulphonyl group;
Y denotes a halogen atom, an alkyl or alkoxy group; and
n is a number from 0 to 3,
and that they are subsequently subjected to a heat treatment.

For X = OR there may be mentioned, for example:
as alkoxy radicals: $C_1$—$C_{18}$—alkoxy radicals, such as the methoxy, ethoxy, propoxy, isopropoxy, n-butoxy, isobutoxy, n-amyloxy, n-hexyloxy, n-heptyloxy, n-octyloxy, isooctyloxy, n-nonyloxy, n-decyloxy, n-dodecyloxy, n-tetradecyloxy, n-hexadecyloxy and n-octadecyloxy radicals;
as cycloalkoxy radicals: the cyclohexyloxy and methyl-cyclohexyloxy radicals;
as aralkoxy radicals: the benzyloxy radical and the methylbenzyloxy radical;
as aryloxy radicals: the phenoxy and methyl-phenoxy radicals.

For X = —COOR there may be mentioned, for example:
as alkoxycarbonyl radicals: primarily $C_1$—$C_{12}$—alkoxycarbonyl radicals, such as the methoxycarbonyl, ethoxycarbonyl, propoxy-carbonyl, isopropoxycarbonyl, butoxycarbonyl, amyloxycarbonyl, hexyloxycarbonyl, 2-ethylhexyloxycarbonyl- and decyloxycarbonyl radical;
as cycloalkoxy-carbonyl radicals: the cyclohexyloxycarbonyl and methyl-cyclohexyloxy-carbonyl radical;
as aralkoxy-carbonyl radicals: the benzyloxycarbonyl and methyl-benzyloxy-carbonyl radical;
as aryloxy-carbonyl radicals: the phenoxycarbonyl, methyl-phenoxy-carbonyl, ethylphenoxycarbonyl, propylphenoxycarbonyl, chlorophenoxycarbonyl, methoxyphenoxycarbonyl, isopropoxyphenoxycarbonyl and chloro-methyl-phenoxycarbonyl radical.

For X = —O—CO—R, there may be mentioned, for example:
as alkyl-carbonyloxy radicals; primarily $C_1$—$C_{16}$—alkanoyloxy radicals, such as the acetyloxy, propionyloxy, isopropionyloxy, n-butyryloxy, tert.-butyryloxy, n-pentanoyloxy, n-hexanoyloxy, 2-ethyl-hexanoyloxy, n-heptanoyloxy, n-octanoyloxy, n-decanoyloxy, n-undecanoyloxy, n-dodecanoyloxy, n-tetradecanoyloxy and n-hexadecanoyloxy radical;
as cycloalkyl-carbonyloxy radicals: the cyclohexyl-carbonyloxy and methyl-cyclohexyl-carbonyloxy radical; as aralkyl-carbonyloxy radicals: the benzylcarbonyloxy and methylbenzyl-carbonyloxy radical;
as aryl-carbonyloxy radicals: the benzoyloxy, methylbenzoyloxy, ethylbenzoyloxy and naphthoyloxy radical.

For X = —OCO$_2$R there may be mentioned, for example:
as alkoxy-carbonyloxy radicals: primarily $C_1$—$C_8$—alkoxy-carbonyl radicals, such as the methoxycarbonyloxy, ethoxy-carbonyloxy, propoxycarbonyloxy, butoxycarbonyloxy, amyloxycarbonyloxy and hexyloxycarbonyloxy radical;
as cycloalkoxy-carbonyloxy radicals: the cyclohexyloxy-carbonyloxy and methyl-cyclohexyloxy-carbonyl radical;
as aralkoxy-carbonyloxy radicals: the benzyloxycarbonyloxy and methylbenzyloxy-carbonyloxy radical.

For X = —OSO$_2$—R$_1$ there may be mentioned, for example:
as alkane-sulphonyloxy radicals: primarily $C_1$—$C_{18}$—alkane-sulphonyloxy radicals, such as the methane-sulphonyloxy, ethane-sulphonyloxy, propane-sulphonyloxy, isopropane-sulphonyloxy, n-butane-sulphonyloxy, isobutane-sulphonyloxy, sec.-butane-sulphonyloxy, n-pentane-sulphonyloxy, isopentane-sulphonyloxy, n-hexane-sulphonyloxy, iso-hexane-sulphonyloxy, n-octane-sulphonyloxy, n-decane-sulphonyloxy, n-dodecane-sulphonyloxy, n-tetradecane-sulphonyloxy and n-hexadecane-sulphonyloxy radical; furthermore, substituted alkane-sulphonyloxy radicals, such as the β-propoxy-ethane-sulphonyloxy radical;
as cycloalkane-sulphonyloxy radicals: the cyclohexane-sulphonyloxy and methyl-cyclohexane-sulphonyloxy radicals;
as aralkyl-sulphonyloxy radicals: the benzylsulphonyloxy and methylbenzyl-sulphonyloxy radical;
as aryl-sulphonyloxy radicals: the benzene-sulphonyloxy, methyl-benzene-sulphonyloxy, ethylbenzene-sulphonyloxy, propyl-benzene-sulphonyloxy, chloro-benzene-sulphonyloxy and methoxy-benzene-sulphonyloxy radical;
as dialkylamino-sulphonyloxy radicals: $C_1$—$C_4$—dialkylamino-sulphonyloxy radicals, such as the N,N-dimethylamino-sulphonyloxy, N,N-diethylamino-sulphonyloxy and N,N-dipropylamino-sulphonyloxy radicals;

For X there may be mentioned the following aryloxy-sulphonyl radicals: the phenoxy-sulphonyl, isopropyl-phenoxy-sulphonyl, tert.-butyl-phenoxy-sulphonyl, amyl-phenoxy-sulphonyl, n-octyl-phenoxy-sulphonyl, iso-nonyl-phenoxy-sulphonyl, di-iso-propyl-phenoxy-sulphonyl, triethyl-phenoxy-sulphonyl, chloro-methyl-phenoxy-sulphonyl and iso-propoxy-phenoxy-sulphonyl radicals.

For Y there may be mentioned:
as halogen atom: primarily the chlorine atom;

as alkyl group, $C_1$—$C_{12}$—alkyl groups, such as the methyl, ethyl, propyl, isopropyl, n-butyl, tert.-butyl, pentyl, isopentyl, hexyl, heptyl, n-octyl, isooctyl, nonyl and dodecyl groups;

as alkoxy group; $C_1$—$C_6$—alkoxy groups, such as the methoxy, ethoxy, propoxy, isopropoxy, butoxy and pentoxy groups.

In the process according to the invention, those anthraquinone dyestuffs of the formula (I) are preferably used, in which X stands for —OR, —OCOR, —$OSO_2R_1$ or an aryloxy-sulphonyl group; among these, those dyestuffs of the formula (I) have proved particularly satisfactory, in which X stands for a group —$OSO_2R_1$ or —OCOR and $n = 0$.

The dyestuffs which are to be used according to the invention for the dyeing from organic solvents are obtained by known methods, for example, by reacting 1-amino-4-hydroxy-anthraquinones carrying in the 2-position an exchangeable substituent, such as a chlorine or bromine atom, a sulphonic acid group or an aryloxy radical, with suitable phenols in the presence of inorganic or organic bases, optionally in inert organic solvents; furthermore by treating suitable 1-amino-4-hydroxy-2-hydroxyaryloxy-anthraquinones with the usual alkylating or acylating agents in the presence of inorganic or organic bases in inert organic solvents; or also by reacting the sulphochlorides of suitable 1-amino-4-hydroxy-2-aryloxy-anthraquinones with appropriate hydroxyaryl compounds in an aqueous-alkaline medium optionally with the addition of inert organic solvents.

Organic solvents suitable for the process according to the invention are those solvents which are not miscible with water and the boiling point of which lies between 40° and 150°C, for example, aromatic hydrocarbons, such as toluene or xylene; aliphatic halogenated hydrocarbons, primarily chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 1,2-dichloro-propane, 1,1,1-trichloropropane, 1-chlorobutane, 2-chlorobutane, 1,4-dichlorobutane, 1-chloro-2-methylpropane or 2-chloro-2-methylpropane; as well as aliphatic fluorochlorinated hydro-carbons, such as perfluoro-n-hexane, 1,2,2-trifluoro-trichloroethane and 1,1,1-trifluoro-pentachloropropane; and aromatic chlorinated and fluorinated hydrocarbons, such as chlorobenzene, fluorobenzene, chlorotoluene and benzotrifluoride.

Tetrachloroethylene, trichloroethylene and 1,1,1-trichloroethane have proved particularly satisfactory. Mixtures of these solvents can also be used.

The synthetic fibre materials to be dyed according to the process of the invention are primarily fibre materials of polyesters, e.g. polyethylene terephthalates or polyesters of 1,4-bis-(hydroxymethyl)-cyclohexane and terephthalic acid; cellulose triacetate; synthetic polyamides, such as poly-$\epsilon$-caprolactam, polyhexamethylene-diamine adipate or poly-$\omega$-aminoundecanic acid; polyurethanes; polyolefines; or polycarbonates. The fibre materials may be prsent in the form of fabrics or knitted fabrics.

For dyeing, the dyestuffs to be used according to the invention are dissolved in the water-immiscible organic solvents, or they are added to the latter in the form of solutions in solvents of unlimited solubility with these solvents, such as alcohols, dimethyl formamide, dimethyl acetamide, dimethyl sulphoxide or sulpholane; the synthetic fibre materials are impregnated with the resultant clear dyestuff solutions which may contain soluble non-ionic auxiliaries to improve the levelness of the dyeings, e.g. the known interface-active ethoxylation and propoxylation products of fatty alcohols, alkylphenols, fatty acid amides and fatty acids. The dyestuffs are subsequently fixed on the fibre materials by a heat treatment. The heat treatment may consist in a brief treatment with dry heat at 120° – 230°C with an intermediate drying possibly preceding the treatment with dry heat, or in treating the fibre materials in overheated solvent vapour at 100° – 150°C. Small amounts of non-fixed dyestuff particles can be washed out by a brief treatment with the cold organic solvent. It should be noted that mixtures of the dyestuffs to be used according to the invention sometimes give a better dyestuff yield than the individual dyestuffs and that they may be more readily soluble in the organic solvent.

With the aid of the process according to the invention it is possible, when dyeing from organic solvents, to achieve on synthetic fibre materials dyeings which are characterised by a high dyestuff yield, very good build-up and outstanding fastness properties, especially very good fastness to thermofixing, washing, rubbing and light. Another advantage of the dyestuffs to be used according to the invention consists in their high solubility in organic solvents, especially in tetrachloroethylene, trichloroethylene, 1,1,1-trichloroethane and 1,1,1-trichloropropane, which enables the dyeing to be carried out without the use of solubilizers.

The parts given in the following Examples are parts by weight.

EXAMPLE 1

A fabric of polyethylene terephthalate fibres is impregnated at room temperature with a clear red solution containing 10 parts 1-amino-2-(3'-n-hexane-sulphonyloxy-phenoxy)-4-hydroxy-anthraquinone in
990 parts tetrachloroethylene.

After squeezing to a weight increase of 60 percent, the fabric is dried at 80°C for 1 minute. The dyestuff is subsequently fixed by heating the fabric to 190° – 220°C for 45 seconds. The small amount of non-fixed dyestuff is subsequently washed out by a short treatment of 20 seconds in cold tetrachloro-ethylene. After drying, there is obtained a clear red dyeing which is characterised by its high dyestuff yield, very good build-up and outstanding fastness properties, especially by very good fastness to thermofixing, washing, rubbing and light.

Clear red dyeings of the same good quality were obtained in an analogous way from (a) cellulose triacetate, (b) synthetic polyamides or polyurethanes and (c) polypropylene fibres, but the thermosolisation was carried out for (a) at 200° – 220°C, for (b) at 170° – 220°C and for (c) at 120° – 150°C.

Equally satisfactory dyeings were also obtained when the 990 parts tetrachloroethylene were replaced with the same amount of one of the following solvents: methylene chloride, choroform, carbon tetrachloride, dichloroethane, trichloroethane, trichloroethylene, tetrachloroethane, dichloropropane, 1,1,1-trichloropropane, chlorobutane, dichlorobutane, perfluoro-n-hexane, 1,2,2-trifluoro-trichloroethane and 1,1,1-trifluoro-pentachloropropane.

The dyestuff used above had been prepared as follows:

5 parts 1-amino-2-(m-hydroxy-phenoxy)-4-hydroxy-anthraquinone were dissolved in 60 parts pyridine. The solution was mixed first with five parts triethylamine, then within 30 minutes at room temperature with 6 parts n-hexane-sulphochloride. After further stirring for one hour at room temperature, the resultant dyestuff was separated by the addition of 80 parts methanol and 20 parts of ice, it was subsequently filtered off with suction and washed with methanol and water. Yield: 6.5 parts of the above compound; melting point after recrystallisation from pyridine: 91° – 92°C.

EXAMPLE 2

A knitted fabric of polyhexamethylene-diamine adipate filaments is impregnated at room temperature with a clear red solution containing 10 parts 1-amino-2-[o-(n-decanoyloxy)-phenoxy]-4-hydroxy-anthraquinone and 7 parts nonylphenol heptaethylene glycol ether in 983 parts tetrachloroethylene.

After squeezing to a weight increase of 60 percent, the knitted fabric is dried at 80°C for one minute. The dyestuff is subsequently fixed by heating the knitted fabric to 192°C for 45 seconds. Small amounts of non-fixed dyestuff are then washed out by a short treatment of about 20 seconds in cold tetrachloro-ethylene. After drying, there is obtained a clear red dyeing which is characterised by its high dyestuff yield, very good build-up and outstanding fastness properties, especially by very good fastness to thermofixing, washing, rubbing and light.

An equally satisfactory dyeing was obtained when the 983 parts tetrachloroethylene were replaced with the same amount of toluene, xylene, chlorobenzene or dichlorobenzene.

The dyestuff used above had been prepared as follows:

6 parts 1-amino-2-(o-hydroxy-phenoxy)-4-hydroxy-anthraquinone dissolved in 60 parts pyridine were mixed with 9 parts n-decanic acid anhydride. The reaction mixture was subsequently heated at 60°C for one hour, diluted with 100 parts methanol and subsequently kept for several hours in an ice-bath. The precipitated dyestuff was filtered off with suction, washed with methanol and water and dried. Yield: 7.7 parts of the above compound; melting point after recrystallisation from pyridine: 77° – 78°C.

EXAMPLE 3

A fabric of polypropylene fibres is impregnated at room temperature with a clear red solution containing 10 parts 1-amino-2-(o-isopropoxy-phenoxy)-4-hydroxy-anthraquinone and 7 parts nonylphenol heptaethylene glycol ether in 983 parts tetrachloroethylene.

After squeezing to a weight increase of 60 percent, the fabric is dried at 80°C for one minute. The dyestuff is subsequently fixed by heating the fabric to 140°C for 30 seconds. Any non-fixed dyestuff particles can be washed out by a short treatment in the cold solvent. A red dyeing is obtained, which is characterised by its high dyestuff yield, very good build-up and good fastness properties, especially by good fastness to thermofixing, washing, rubbing and light.

The dyestuff used above had been prepared as follows:

75 parts 2-hydroxy-1-isopropoxy-benzene and 11 parts potassium carbonate were heated at 130°C for two hours. After the addition of 40 parts N-methyl-pyrrolidone and 15 parts 1-amino-2-bromo-4-hydroxy-anthraquinone, the reaction mixture was heated at 150°C for two hours, then acidified with glacial acetic acid and subsequently distilled with steam. 18 Parts of the above compound were obtained.

EXAMPLE 4

A fabric of poly-1,4-cyclohexane-dimethylene terephthalate is impregnated at room temperature with a clear red solution containing 10 parts 1-amino-2-[p-(2'-ethylhexyloxy-carbonyl)-phenoxy]-4-hydroxy-anthraquinone and 7 parts nonylphenol heptaethylene glycol ether in 983 parts tetrachloroethylene. After squeezing to a weight increase of 60 percent, the fabric is dried at 80°C for 1 minute. The dyestuff is subsequently fixed by heating the fabric to 190° – 220°C for 45 seconds. The small amount of non-fixed dyestuff is then removed by a short treatment of 20 seconds in cold tetrachloroethylene. After drying, there is obtained a clear red dyeing which is characterised by its high dyestuff yield, very good build-up and outstanding fastness properties, especially by very good fastness to thermofixing, washing, rubbing and light.

The dyestuff used above had been prepared as follows:

8 parts anhydrous potassium carbonate were dissolved in 80 parts 4-hydroxy-benzoic acid-(2'-ethylhexyl)-ester at 130°–140°C. After the introduction of 10 parts 1-amino-2-bromo-4-hydroxy-anthraquinone, the reaction mixture was heated at 150°C for four hours and subsequently cooled to about 60°C. The resultant dyestuff was precipitated by the addition of 120 parts methanol and 50 parts of water, subsequently filtered off with suction, and washed with methanol and water. Yield: 12.4 parts of the above compound; melting point after recrystallisation from pyridine: 103° – 104°C.

EXAMPLE 5

A fabric of anionic-modified polyethylene terephthalate fibres (Dacron 64 ) is impregnated at room temperature with a clear red solution containing 5 parts 1-amino-2-[p-(p'-tosyloxy)-phenoxy]-4-hydroxy-anthraquinone, 5 parts 1-amino-2-[p-(o'-tosyloxy)-phenoxy]-4-hydroxy-anthraquinone and 7 parts nonylphenol heptaethylene glycol ether in 983 parts tetrachloroethylene.

After squeezing to a weight increase of 60 percent, the fabric is dried at 80°C for one minute. The dyestuff is subsequently fixed by heating the fabric to 190° – 220°C for 45 seconds. The small amount of non-fixed dyestuff is then washed out by a short rinsing with cold tetrachloroethylene. After drying, there is obtained a clear red dyeing which is characterised by a high dyestuff yield, very good build-up and outstanding fastness properties, especially by very good fastness to thermofixing, washing, rubbing and light.

The dyestuffs used above had been prepared as described in Example 1 but, instead of 1-amino-2-(m-hydroxy-phenoxy)-4-hydroxy-anthraquinone, the same amount of 1-amino-2-(p-hydroxyphenoxy)-4-hydroxy-anthraquinone was reacted with the equivalent amount of p-tosyl chloride respectively o-tosyl chloride. After recrystallisation from pyridine the resultant 1-amino-2-[p-(p'-tosyloxy)-phenoxy]-4-hydroxy-anthraquinone melted at 174° – 175°C, the corresponding 1-amino-2-[p-(o-tosyloxy)-phenoxy]-4-hydroxy-anthraquinone at 131° – 132°C.

EXAMPLE 6

A fabric of polyethylene terephthalate fibres is impregnated at room temperature with a clear red solution containing 10 parts 1-amino-2-[p-(n-octyloxy)-phenoxy]-4-hydroxy-anthraquinone in
990 parts 1,1,1-trichloroethane.

After squeezing to a weight increase of 60 percent, the dyestuff is fixed by treating the fabric for 45 seconds with overheated 1,1,1-trichloroethane vapour at 140°C. The small amount of non-fixed dyestuff is subsequently washed out by briefly rinsing in cold 1,1,1-trichloroethane. After drying, there is obtained a clear red dyeing which is characterised by its high dyestuff yield, very good build-up and outstanding fastness properties.

An equally satisfactory red dyeing was obtained by the same method of operation on a fabric of polycarbonate fibres.

The dyestuff used above had been prepared as follows:

5 parts 1-amino-2-(p-hydroxy-phenoxy)-4-hydroxy-anthraquinone were heated together with 3.5 parts of anhydrous sodium carbonate and 7 parts p-toluene-sulphonic acid n-octyl ester in 50 parts of anhydrous nitrobenzene at 200°C for 45 minutes. After cooling to 60°C, the resultant dyestuff was precipitated by adding 80 parts methanol to the reaction mixture. After filtering off with suction and washing with methanol and water, there were obtained 5.3 parts and by steam distillation of the nitrobenzene filtrate a further 2.2 parts of the above compound; melting point after recrystallisation from pyridine: 116° – 117°C.

EXAMPLE 7

A knitted fabric of anionic-modified polyamide fibres (Nylon T 844) is impregnated at room temperature with a clear red solution containing 10 parts 1-amino-2-(o-methoxy-phenoxy)-4-hydroxy-anthraquinone and
7 parts nonylphenol heptaethylene glycol ether in 983 parts tetrachloroethylene.

After squeezing to a weight increase of 60 percent, the knitted fabric is dried at 80°C for one minute. The dyestuff is subsequently fixed by heating the knitted fabric to 192°C for 45 seconds. Small amounts of non-fixed dyestuff are then washed out by a short treatment of about 20 seconds in cold tetrachloroethylene. After drying, there is obtained a red dyeing which is characterised by a high dyestuff yield, very good build-up and good fastness properties, especially by good fastness to thermofixing, washing, rubbing and light.

The dyestuff used above had been prepared as follows:

35 parts of anhydrous potassium carbonate were dissolved in 250 parts 2-methoxy-phenol by heating at 130° – 140°C for 2 hours. After the introduction of 50 parts 1-amino-2-chloro-4-hydroxy-anthraquinone, the reaction mixture was heated at 150°C for five hours and subsequently cooled to about 60°C. The resultant dyestuff was precipitated by the addition of 200 parts methanol, subsequently filtered off with suction and washed with methanol and water. 49.1 Parts of the above compound were obtained; melting oint after recrystallisation from pyridine: 180° – 181°C.

EXAMPLE 8

A fabric of cellulose triacetate fibres is impregnated at room temperature with a clear red solution containing 10 parts 1-amino-2-[m-(n-decanoyloxy)-phenoxy]-4-hydroxy-anthraquinone and
7 parts nonylphenol heptaethylene glycol ether in 983 parts tetrachloroethylene.

After squeezing to a weight increase of 60 percent, the fabric is dried at 80°C for 1 minute. The dyestuff is subsequently fixed by heating the fabric at 215°C for one minute. A clear red dyeing is obtained, which is characterised by a high dyestuff yield, very good texture and outstanding fastness properties, especially by very good fastness to thermofixing, washing, rubbing and light.

The dyestuff used above was obtained in analogy with the dyestuff described in Example 2 but the 1-amino-2-(o-hydroxy-phenoxy)-4-hydroxy-anthraquinone there used was replaced with the equivalent amount of 1-amino-2-(m-hydroxy-phenoxy)-4-hydroxy-anthraquinone. After recrystallisation from pyridine, the resultant dyestuff melted at 68° – 70°C.

Clear red dyeings with equally satisfacotry fastness properties were also obtained on fabrics of polyester, triacetate, polyamide, polyurethane, polycarbonate and polyolefine fibres, when the dyestuffs described in Examples 1 – 8 were replaced with the dyestuffs listed in the following Table:

| Example | Dyestuff |
|---|---|
| 9 | 1-amino-2-[o-(methane-sulphonyloxy)-phenoxy]-4-hydroxy-anthraquinone |
| 10 | 1-amino-2-[o-(n-decane-sulphonyloxy)-phenoxy]-4-hydroxy-anthraquinone |
| 11 | 1-amino-2-[m-(n-butane-sulphonyloxy)-phenoxy]-4-hydroxy-anthraquinone |
| 12 | 1-amino-2-[m-(benzylsulphonyloxy)-phenoxy]-4-hydroxy-anthraquinone |
| 13 | 1-amino-2-[m-(cyclohexane-sulphonyloxy)-phenoxy]-4-hydroxy-anthraquinone |
| 14 | 1-amino-2-[p-(p'-ethyl-benzene-sulphonyloxy)-phenoxy]-4-hydroxy-anthraquinone |
| 15 | 1-amino-2-[p-(p'-chlorobenzene-sulphonyloxy)-phenoxy]-4-hydroxy-anthraquinone |
| 16 | 1-amino-2-[o-(ethylamino-sulphonyloxy)-phenoxy]-4-hydroxy-anthraquinone |
| 17 | 1-amino-2-[m-(propylamino-sulphonyloxy)-phenoxy]-4-hydroxy-anthraquinone |
| 18 | 1-amino-2-[p-(N,N-diethylamino-sulphonyloxy)-phenoxy]-4-hydroxy-anthraquinone |
| 19 | 1-amino-2-[m-(N,N-dipropylamino-sulphonyloxy)-phenoxy]-4-hydroxy-anthraquinone |
| 20 | 1-amino-2-[m-(n-hexanoyloxy)-phenoxy]-4-hydroxy-anthraquinone |

| Example | Dyestuff |
|---|---|
| 21 | 1-amino-2-[m-(n-pentanoyloxy)-phenoxy]-4-hydroxy-anthraquinone |
| 22 | 1-amino-2-[p-(n-decanoyloxy)-phenoxy]-4-hydroxy-anthraquinone |
| 23 | 1-amino-2-[o-(n-butoxycarbonyl)-phenoxy]-4-hydroxy-anthraquinone |
| 24 | 1-amino-2-[m-(n-octyloxycarbonyl)-phenoxy]-4-hydroxy-anthraquinone |
| 25 | 1-amino-2-[p-(n-hexyloxycarbonyl)-phenoxy]-4-hydroxy-anthraquinone |
| 26 | 1-amino-2-[p-(iso-pentyloxycarbonyl)-phenoxy]-4-hydroxy-anthraquinone |
| 27 | 1-amino-2-[o-(n-butane-sulphonyloxy)-phenoxy]-4-hydroxy-anthraquinone |
| 28 | 1-amino-2-[o-ethoxy-phenoxy]-4-hydroxy-anthraquinone |
| 29 | 1-amino-2-[o-propoxy-phenoxy]-4-hydroxy-anthraquinone |
| 30 | 1-amino-2-[m-(n-butoxy)-phenoxy]-4-hydroxy-anthraquinone |
| 31 | 1-amino-2-[m-(n-octyloxy)-phenoxy]-4-hydroxy-anthraquinone |
| 32 | 1-amino-2-[p-(isooctyloxy)-phenoxy]-4-hydroxy-anthraquinone |
| 33 | 1-amino-2-[p-(n-dodecyloxy)-phenoxy]-4-anthraquinone |
| 34 | 1-amino-2-[m-(n-heptyloxy)-phenoxy]-4-hydroxy-anthraquinone |
| 35 | 1-amino-2-[o-isoamyloxy-phenoxy]-4-hydroxy-anthraquinone |
| 36 | 1-amino-2-[p-(p'-methyl-benzoyloxy)-phenoxy]-4-hydroxy-anthraquinone |
| 37 | 1-amino-2-[m-(m'-trifluoromethylbenzoyloxy)-phenoxy]-4-hydroxy-anthraquinone |
| 38 | 1-amino-2-[o-(p'-tert.butyl-benzoyloxy)-phenoxy]-4-hydroxy-anthraquinone |
| 39 | 1-amino-2-[p-(ethoxycarbonyloxy)-phenoxy]-4-hydroxy-anthraquinone |
| 40 | 1-amino-2-[m-(propoxycarbonyloxy)-phenoxy]-4-hydroxy-anthraquinone |
| 41 | 1-amino-2-[o-(phenoxycarbonyloxy)-phenoxy]-4-hydroxy-anthraquinone |
| 42 | 1-amino-2-[o-chloro-p-(isoamyloxycarbonyl)-phenoxy]-4-hydroxy-anthraquinone |
| 43 | 1-amino-2-[m-benzyloxy-phenoxy]-4-hydroxy-anthraquinone |
| 44 | 1-amino-2-[m-cyclohexyloxy-phenoxy]-4-hydroxy-anthraquinone |
| 45 | 1-amino-2-[o-methoxy-m-methyl-phenoxy]-4-hydroxy-anthraquinone |
| 46 | 1-amino-2-[o-methoxy-p-methyl-phenoxy]-4-hydroxy-anthraquinone |
| 47 | 1-amino-2-[o-m-dimethoxy-phenoxy]-4-hydroxy-anthraquinone |
| 48 | 1-amino-2-[o-ethoxy-p-methyl-phenoxy]-4-hydroxy-anthraquinone |
| 49 | 1-amino-2-[o-methoxy-m-(n-pentane-sulphonyloxy)-phenoxy]-4-hydroxy-anthraquinone |
| 50 | 1-amino-2-[m-methyl-p-(n-hexane-sulphonyloxy)-phenoxy]-4-hydroxy-anthraquinone |
| 51 | 1-amino-2-[p-butyl-m-(methane-sulphonyloxy)-phenoxy]-4-hydroxy-anthraquinone |
| 52 | 1-amino-2-[m-methyl-p-(n-butoxycarbonyl)-phenoxy]-4-hydroxy-anthraquinone |
| 53 | 1-amino-2-[p-(p'-dodecylphenoxysulphonyl)-phenoxy]-4-hydroxy-anthraquinone |
| 54 | 1-amino-2-[p-(p'-tert.butylphenoxysulphonyl)-phenoxy]-4-hydroxy-anthraquinone |
| 55 | 1-amino-2-[p-(p'-isooctylphenoxysulphonyl)-phenoxy]-4-hydroxy-anthraquinone |
| 56 | 1-amino-2-[p-(p'-isopropylphenoxysulphonyl)-phenoxy]-4-hydroxy-anthraquinone |
| 57 | 1-amino-2-[p-(o'-sec.butylphenoxysulphonyl)-phenoxy]-4-hydroxy-anthraquinone |
| 58 | 1-amino-2-[p-(o'-isopropylphenoxysulphonyl)-phenoxy]-4-hydroxy-anthraquinone |
| 59 | 1-amino-2-[p-tert.butyl-o- and -m-(p'-tert.butyl-phenoxysulphonyl)-phenoxy]-4-hydroxy-anthraquinone, mixture |
| 60 | 1-amino-2-[p-tert.butyl-o- and -m-(p'-isooctylphenoxy-sulphonyl)-phenoxy]-4-hydroxy-anthraquinone, mixture |
| 61 | 1-amino-2-[p-isooctyl-o- and -m-(p'-tert.butyl-phenoxy-sulphonyl)-phenoxy]-4-hydroxy-anthraquinone, mixture |
| 62 | 1-amino-2-[p-isooctyl-o- and -m-(p'-isooctyl-phenoxy-sulphonyl)-phenoxy]-4-hydroxy-anthraquinone, mixture |
| 63 | 1-amino-2-[o, p-dimethyl-m-(p'-tert.butyl-phenoxy-sulphonyl)-phenoxy]-4-hydroxy-anthraquinone |
| 64 | 1-amino-2-[o-chloro-m-methyl-p-(p'-isooctylphenoxy-sulphonyl)-phenoxy]-4-hydroxy-anthraquinone. |

EXAMPLE 65

A fabric of polyethylene terephthalate fibres is impregnated at room temperature with a clear red solution containing 10 parts 1-amino-2-[p-(p'-nonylphenoxysulphonyl)-phenoxy]-4-hydroxy-anthraquinone and 7 parts nonylphenol heptaethylene glycol ether in 983 parts tetrachloroethylene.

After squeezing to a weight increase of 60 percent, the fabric is dried at 80°C for one minute. The dyestuff is subsequently fixed by heating the fabric to 190° – 220°C for 45 seconds. The small amount of non-fixed dyestuff is then washed out by a short rinsing with cold tetrachloroethylene. After drying, there is obtained a clear red dyeing which is characterised by its high dyestuff yield, very good build-up and very good fastness properties, especially by very good fastness to thermo-fixing, washing, rubbing and light.

The dyestuff used above had been prepared as follows:

10 parts 1-amino-2-phenoxy-4-hydroxy-anthraquinone were introduced at 0° – 5°C into a mixture of 50 parts chlorosulphonic acid and 5 parts thionyl chloride. The reaction mixture was slowly heated to 50°C, kept at the same temperature for 1 ½ hours, cooled and poured on to ice. The precipitated sulphochloride was suction filtered and washed with ice-water until neutral. The moist sulphochloride was subsequently introduced at room temperature into a mixture of 100 parts acetone, 5 parts triethylamine and 10 parts nonyl-phenol and the mixture was heated under reflux for six hours. After cooling, the precipitated dyestuff was filtered off with suction, washed with a little acetone and water, and dried. 15,4 parts of the above compound were obtained.

We claim:
1. Process for the continuous dyeing of synthetic polyester fiber material comprising the steps of
A. impregnating the fiber material with a nonaqueous dyeing liquor consisting essentially of an organic solvent and an anthraquinone dyestuff said organic solvent consisting of water-immiscible halogenated hydrocarbon having a boiling point between 40° and 150°C said anthraquinone dyestuff having the formula

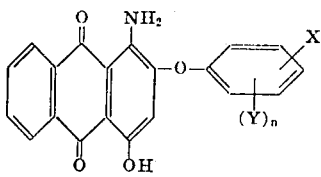

in which X is —OR, —COOR, —O—COR, —O-COOR, —OSO$_2$R$_1$, or aryloxysulfonyl;

R is alkyl of up to 18 carbon atoms; cycloalkyl, aralkyl or aryl;

R$_1$ is alkyl of up to 18 carbon atoms, cycloalkyl, aralkyl, aryl or C$_1$—C$_4$—dialkyl-amino;

Y is halogen, alkyl of up to 12 carbon atoms or alkoxy; and $n$ is a number from 0 to 3; and B. subjecting the fiber material to a heat treatment to fix said dyestuff on said fiber.

2. The process of claim 1 in which X is —OR$_2$, —COOR$_3$, —O—COR$_4$, —OCOOR$_5$, —OSO$_2$R$_6$, or —O$_2$—S—OR$_7$;

R$_2$ is C$_1$—C$_{18}$—alkyl, cyclohexyl, methylcyclohexyl, benzyloxy, methylbenzyloxy, phenoxy or methylphenoxy;

R$_3$ is C$_1$—C$_{12}$—akyl, cyclohexyl, methylcyclohexyl, benzyl, methylbenzyl, phenyl, methylphenyl, ethylphenyl, propylphenyl, chlorophenyl, methoxyphenyl, isopropoxy-phenyl or chloro-methylphenyl;

R$_4$ is C$_1$-C$_{16}$-alkyl, cyclohexyl, methylcyclohexyl, benzyl, methylbenzyl, phenyl, methylphenyl, ethylphenyl, or naphthyl;

R$_5$ is C$_1$—C$_8$—alkyl, cyclohexyl, methylcyclohexyl, benzyl or methylbenzyl;

R$_6$ is C$_1$—C$_{18}$—alkyl, cyclohexyl, methylcyclohexyl, benzyl, methylbenzyl, phenyl, methylphenyl, ethylphenyl, propylphenyl, chlorophenyl, methoxyphenyl, or C$_1$—C$_4$—dialkylamino;

R$_7$ is phenyl or phenyl substituted with alkyl of up to nine carbon atoms, alkoxy of up to 3 carbon atoms or chloro;

Y is halogen, C$_1$—C$_{12}$—alkyl or C$_1$—C$_6$—alkoxy; and $n$ is a number from 0 to 3.

3. The process of claim 1 in which X is —OR, or —O—COR or —OSO$_2$R$_1$.

4. The process of claim 1 in which
X is —O—COR or —O—SO$_2$—R$_1$; and
$n$ is 0.

5. The process of claim 1 in which said water-immiscible organic solvent is an aliphatic chlorohydrocarbon having a boiling point of between 40° and 150°C.

6. The process of claim 1 in which said water-immiscible organic solvent is selected from a chlorinated or a chlorofluorinated aliphatic organic solvent having a boiling point between 40° and 150°C.

7. The process of claim 1 in which said anthraquinone dyestuff is soluble in said water-immiscible organic solvent.

8. The process of claim 7 in which the dyed material is subjected to a subsequent step of (C) rinsing with water-immiscible organic solvent in which said anthraquinone dyestuff is soluble.

* * * * *